Feb. 14, 1961 M. E. CAILLAUD 2,971,465
DIAPHRAGM PUMPS
Filed May 14, 1957 2 Sheets-Sheet 1
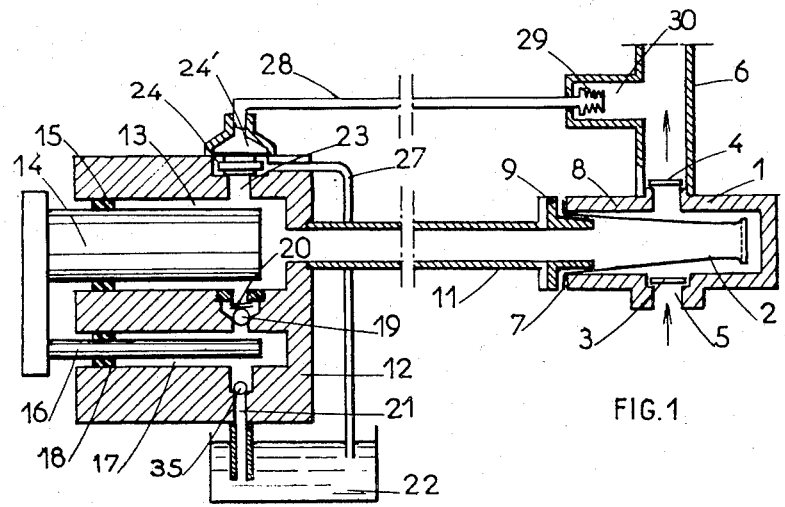
FIG. 1
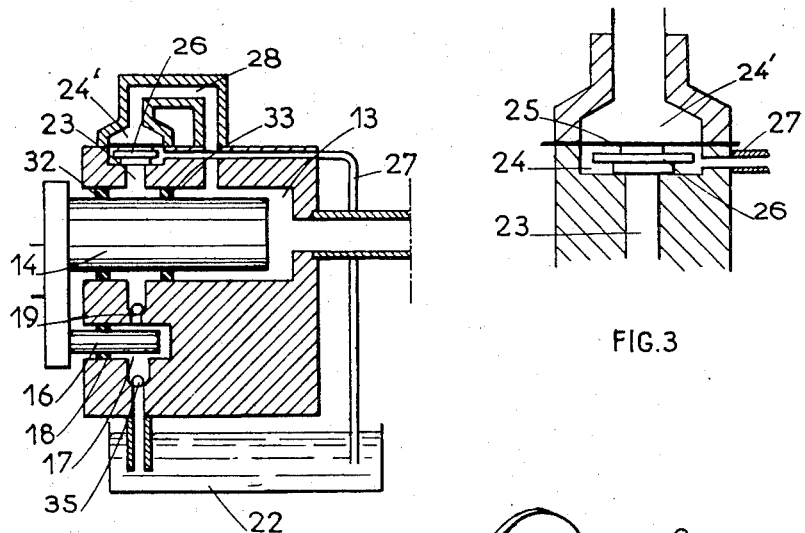
FIG. 4
FIG. 3
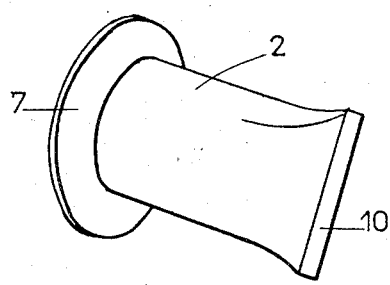
FIG. 2
INVENTOR
Michel Eugène CAILLAUD
BY
ATTORNEYS Feb. 14, 1961 M. E. CAILLAUD 2,971,465
DIAPHRAGM PUMPS Filed May 14, 1957 2 Sheets-Sheet 2

INVENTOR
Michel Eugène CAILLAUD
BY
ATTORNEYS

United States Patent Office 2,971,465
Patented Feb. 14, 1961

2,971,465
DIAPHRAGM PUMPS

Michel Eugène Caillaud, Suresnes, France, assignor to Societe Anonyme Francaise pour la Separation, l'Emulsion et le Melange (Procedes S.E.M.), Paris, France Filed May 14, 1957, Ser. No. 659,140

Claims priority, application France May 15, 1956

3 Claims. (Cl. 103—44)

It is a well known fact that when it is desired to pump corrosive liquids or liquids liable to attack stuffing boxes or again liquids which are very valuable such as serums or the like, the usual piston or the like pumps cannot be used by reason of the leaks which always appear inside the stuffing boxes. It is therefore necessary to resort to pumps in which the pumping liquid is set in motion no longer by a piston but by a deformable diaphragm. The movements of this diaphragm may be controlled by the movements of a driving liquid which is controlled in its turn by a piston or the like pump. This is the case in particular when it is desired to provide accurate volumetric pumps since in such a case the amount of liquid delivered by the piston for the control of the diaphragm, which amount may be defined accurately, corresponds exactly to the amount of liquid delivered by the diaphragm, said intermediate driving liquid not being compressible. The diaphragm pumps now extant include generally a flat metal diaphragm of a substantially circular shape and capable of being deformed more or less elastically through the pressure of the control liquid. Such diaphragm pumps show different drawbacks and in particular the shifting of the actual diaphragm is generally comparatively small and consequently, even in the case of comparatively small throughputs, it is necessary to resort to diaphragms of a large diameter. When it is desired to obtain substantially larger throughputs, it is thus necessary to use diaphragms of considerable diameters which leads to an exaggerated bulk and consequently to a limitation in the use of the pump.

Furthermore, the diaphragms considered should have a sufficient elasticity and be made of metal, rubber or the like elastic material which in certain cases shows an insufficient resistance to corrosion when handling liquids which are particularly active in a chemical sense.

The present invention has for its primary object the execution of diaphragm pumps the size of which is not exaggerated with reference to the throughput required.

It has also for its object the execution of diaphragm pumps the diaphragm of which may be made of only slightly elastic material, while it is extremely resistant to corrosion, such for instance as polyfluorethylene.

It has for its still further object the possibility of executing very simply pumps of this type which are accurately volumetric and of which it is possible to modify the throughput for adjustment during operation so as to obtain a well defined throughput value.

It has also for its object the obtention in all cases with the utmost reliability of a constant value for the volume of the intermediate driving liquid delivered by the piston pump, so as to provide an excellent accuracy in the measuring of the amount of said liquid delivered at each stroke of the pump.

The invention has also for its object the execution of pumps of the type referred to, the structure of which is very simple and mechanically resistant.

To this end, it is of advantage to use no longer comparatively flat diaphragms but diaphragms of a generally tubular structure so that it is possible to make their shape and the volume defined by them vary without the diaphragm being subjected to any modification in area which might lead to an elastic deformation of said surfaces.

In a first embodiment, such a diaphragm may be constituted by a cylindrical, conical or the like element immersed inside the liquid to be conveyed while one of its ends is secured to and communicates with a capacity containing the intermediate driving liquid and its other end is closed and is for instance flattened and/or set in a manner such that the whole diaphragm is in the general shape of a toothpaste tube for instance.

According to another embodiment of the invention, the diaphragm of a tubular shape is open at both ends and is inserted directly in the channel feeding the liquid to be pumped, said channel carrying ahead and beyond said tubular diaphragms input and output flap valves, said tubular diaphragm being enclosed inside a chamber containing the driving liquid and connected hydraulically with the pump body the stroke of the piston pump of which is advantageously adjustable.

On the other hand, the arrangement is preferably designed in a manner such that the static pressure of the driving liquid remains substantially equal to the pressure of the liquid to be conveyed and the diaphragm is consequently subjected to only a reduced straining. Under such conditions and as mentioned hereinabove, it is possible to resort to diaphragms made of a material which is only slightly elastic such as polyfluorethylene the life of which is moreover considerable.

The tubular element is constituted preferably by an inner sheet of a deformable substance such as a polyfluorethylene or the like very slightly elastic material, such a tube being preferably surrounded by a sheath preferably welded thereto and made of rubberized canvas for instance, which is substantially non expansible so as to prevent if required, any permanent deformation of the polyfluorethylene body.

Furthermore, there is advantageously provided round the diaphragm and inside the chamber containing said diaphragm, a tubular screen in which perforations are arranged preferably in two diametrically opposed areas so as to direct the admission of the driving liquid onto two unvarying sections of the diaphragm. Furthermore, and preferably, the piston pump may be designed in a manner such that its dead point corresponding to a maximum compression of the diaphragm retains a constant position whatever may be the adjusted length of the stroke of the piston for said controlling pump; this results in the fact that the maximum deformation of the diaphragm as obtained through crushing will remain always the same whatever may be the length of the compression stroke and it is possible to provide inside the tube forming the diaphragm a sort of mandrel rigid therewith and closing to a maximum extent the passageway left open by the tubular diaphragm when in its position of maximum compression.

The position of the piston pump providing maximum suction will obviously vary according to the adjustment and this leads to a varying extent of compression for the diaphragm. The adjustment of the maximum length of stroke for the piston, i.e. the adjustment of the maximum throughput of the pump is selected preferably so as to correspond to the position of the diaphragm limiting a maximum volume, i.e. to the position for which the diaphragm returns into its normal cylindrical shape.

On the other hand and in conformity of the invention, there is advantageously provided on the capacity containing the intermediate controlling liquid an arrangement for the automatic compensation of the leaks of liquid together with a safety valve.

Other features and objects of the invention will appear in the reading of the following description of various embodiments of the invention illustrated diagrammatically and by no means in a limiting sense in the accompanying drawings, said embodiments being applied to a measuring pump adapted to convey liquids which cannot be conveyed by an ordinary piston pump and the output of which may be modified and adjusted during operation independently of the rhythm of movement of the piston. In the accompanying drawings:

Fig. 1 is a general sectional view of the pump arrangement according to the invention.

Fig. 2 is a perspective view of the diaphragm used in the case of Fig. 1.

Fig. 3 shows on a larger scale a detail of Fig. 1.

Fig. 4 is a sectional view similar to Fig. 1 of a modification of said Fig. 1.

Figure 5:
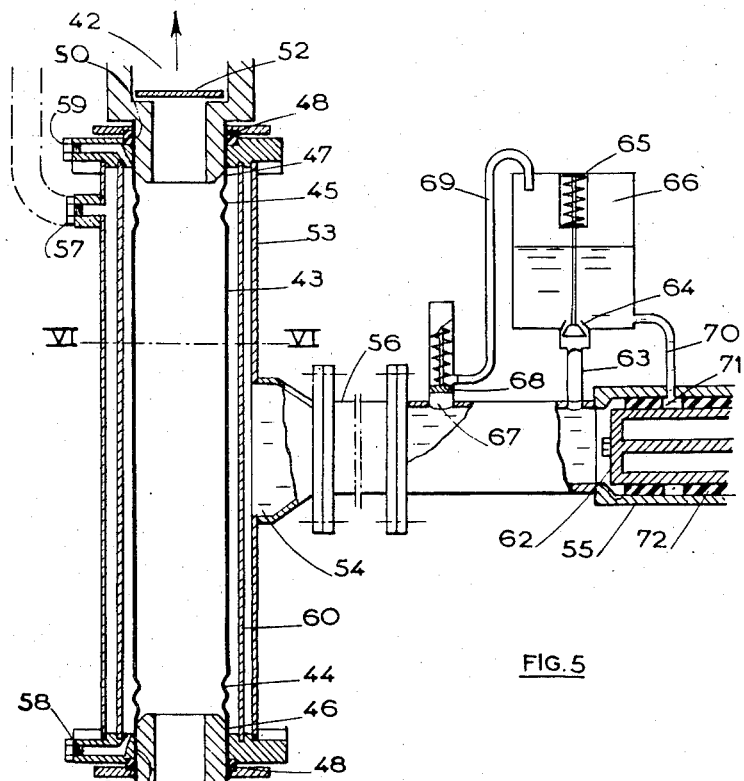
Fig. 5 is a longitudinal cross-section through the system including a diaphragm pump and its hydraulic controlling means, said system shown in a highly diagrammatic manner corresponding to a further embodiment.

In Fig. 1, 1 designates the pump body containing the improved diaphragm 2 which is adapted to pump a liquid which cannot be pumped through an ordinary piston pump because of the leaks occurring in the stuffing box, of the risk of corrosion, etc.

The body 1 includes an input flap valve 3 and an output valve 4 arranged respectively on the input pipe 5 and on the output pipe 6. In said output pipe is also provided a pressure regulator 29—30 described hereinafter.

The diaphragm 2 has the general shape illustrated more clearly in the perspective view of Fig. 2, i.e. it has a tubular shape with an outer flange 7 at one of its ends which flange is clamped as shown in Fig. 1 between one end 8 of the pump body and an annular flange 9 on the pipe 11 fed with the intermediate driving or controlling liquid. The opposite end of the diaphragm 2 is flattened and clamped at 10 by any suitable securing means such as those used for closing tooth paste or the like tubes for instance. This diaphragm is made of a polytetrafluorethylene of a comparatively low elasticity. The cross-section of the tubular diaphragm 2 may be selected as desired, but the diaphragm is preferably cylindrical or conical; in this latter case, it flares preferably to a slight extent between its closed end 10 and the flange 7 so that the length of the closed section 10 differs only to a small extent from the diameter of the tube at the point at which it merges into the flange 7. Thus the closed section 10 may be housed easily inside the bore formed in the pump body 1.

The pipe 11 is connected with the body of the pump 12 handling the driving liquid, said body carrying slidingly a plunger piston 14, suitable packings 15 being fitted between the piston 14 and the pump body 12. The piston carries a control member which is not illustrated and which reciprocates it in a conventional manner. Preferably, the stroke of said control member is adjustable as described for instance in my copending specification Serial No. 634,059, filed on January 14, 1957, such a control member providing for an adjustment of the stroke of the piston within a range comprised between zero and a predetermined maximum; the piston returns then always at the end of its compression stroke into the same position which is for instance that illustrated in Fig. 1 whatever may be the length of stroke provided for the piston. In other words, said stroke begins always whatever may be the adjusted length of said stroke at an idle point which is that illustrated in Fig. 1 and finishes at another idle point which is more or less distant from the first mentioned point according to the adjustment made.

The chamber 13 inside the piston pump body, the pipe 11 and the diaphragm 2 are filled with a suitable liquid to be described hereinafter and it will be readily ascertained that any movement of the piston has for its result a delivery or an extraction out of said diaphragm of an amount of liquid corresponding to the operative modification in volume of the chamber 13 of the pump body 12. A modification in the corresponding volume defined by the diaphragm 2 produces consequently an equivalent modification in the volume of the operative volume formed outside said diaphragm inside the pump body 1. For each reciprocation of the piston, the operative volume increases and decreases, whereby there is obtained obviously through the valve 4 and 5 a pumping of an amount of liquid which is exactly equal to the amount of liquid delivered by the reciprocating piston 14. I will now describe the arrangement which allows providing on the one hand for constancy of the volume of the driving liquid inside the capacity provided for it and on the other hand for an approximate balance between the pressure of said driving liquid and the liquid to be conveyed for the purposes specified.

To this end, the piston 14 is rigid with a piston 16 the diameter of which is much smaller and which moves in parallelism with the said piston 14 inside a corresponding bored pump body 17, said pump body 17 being preferably in one with the pump body 12. 18 designates the packing providing for fluidtightness between the moving piston 16 and its pump body.

The delivery pipe for the pump body 17 opens into the parallel pump body 12, said pipe carrying a ball valve 19 urged against its seat by a spring 20. 21 designates the suction pipe for the pump body 17 opening through the agency of the ball valve 35 inside a container 22 containing the intermediate controlling liquid subjected to atmospheric pressure.

Furthermore, the body of the pump 12 communicates through a pipe 23 with a chamber subdivided into two compartments 24 and 24' by an auxiliary diaphragm 25 rigid with a closing valve 26. This arrangement is illustrated on a larger scale in Fig. 3. The compartment 24 located underneath the diaphragm 23 communicates with a return pipe 27 opening into the above mentioned container 22. The compartment 24' located above the auxiliary diaphragm 25 communicates through a pipe 28 with a diaphragm 29, of the accordian or bellows type for instance, which is located inside a chamber 30 opening into the output pipe 6 for the liquid to be conveyed.

The arrangement which has just been described operates as follows with a view to providing for constancy of the volume of the driving liquid inside the capacity occupied by it together with an approximate equality of pressure between the driving or controlling liquid and the conveyed liquid.

To each compression stroke of the piston 14, which results in a complete filling of the diaphragm 2, whatever may be the length of the stroke of said piston 14 since said stroke ends always at the same starting point for the piston 14, there corresponds a parallel movement of the piston 16. This auxiliary piston 16 delivers through the valves 19 and 21 liquid into the pump body 12, the amount of said liquid being equal at least to the volume of the leaks which may pass out through the stuffing box 15. When the piston 14 reaches the end of its stroke and the diaphragm 2 has a tendency therefore to expand to its utmost, the pressure inside the pump body 12 has a tendency to increase. Thus the flap valve 26 rises against the action of the diaphragm 25 and any excess liquid returns through the pipe 27 into the vat 22, and consequently the volume of controlling liquid inside the capacity containing it and including the bore 13 in the pump body 12, the pipe 11 and the diaphragm 2, retains permanently the same value.

Furthermore, the pressure inside said capcity 13—11—2 remains always substantially equal to the pressure of the liquid conveyed inside the pipe 6 since, assuming for instance the pressure increases inside said pipe 6, it will have a tendency to crush the bellows 29 and the liquid contained inside the pipe 28 and in the upper section of the chamber 24 will urge downwardly the auxiliary diaphragm 25 and thereby the valve 26 against its seat so as to prevent any return of the liquid out of the capacity 13—23 into the pipe 27. The pressure will therefore increase inside the pump chamber 13 until it reaches a value slightly above that of the pressure inside the pipe 6.

Whenever the pressure in said pipe 6 decreases, the opposite result is obtained and the diaphragm 25 has a tendency to release the flap valve 26 to a larger extent and therefore to reduce the pressure inside the capacity containing the controlling liquid until the pressure of the latter becomes equal to that of the liquid in the main delivery pipe 6.

It will be readily apparent under such conditions that the diaphragm 2 is subjected only to very limited stresses and consequently its life is a long one.

In practice, a suitable selection of the ratio between the area of the inner surface of the flap valve 26 bearing on its seat and the surface of said flap valve rigid with the diaphragm 25 may provide for a slight over-pressure of the intermediate driving liquid with reference to the main conveyed liquid so as to obtain the desired effect.

Fig. 4 illustrates a modification of said arrangement in which modification the delivery pipe 23 of the liquid fed by the pump body 12 is fitted inside said pump body in a manner such as to open between two stuffing boxes 32 and 33 providing for fluid-tightness of the reciprocatory piston.

On the other hand, the pipe delivering the liquid out of the auxiliary pump body 17 is arranged in the same manner as in the case illustrated in Fig. 1, except for the fact that the ball valve 19 associated therewith does not require any spring urging it against its seat.

Furthermore, the pipe 28 opening into the upper end of the chamber 24' instead of being connected as precedingly with the bellow-shaped diaphragm 29 housed inside the exhaust pipe 6 of the liquid that is being conveyed, communicates directly with the chamber 13 of the pump body 12.

The arrangement described with reference to Fig. 4 operates as follows: as precedingly there corresponds to each compression stroke of the piston 14 an equal stroke of the piston 16 but the liquid from the pump body 17 enters no longer directly the chamber 13 but it enters the space comprised between the two stuffing boxes or packings 32 and 33, which ensures a slight overpressure for the liquid inside said space with reference to that in the remainder of the chamber 13. Consequently, no liquid can leak through the stuffing box 33 out of the main section of the chamber 13 in the pump body towards said space. The volume of liquid contained in the capacity comprising the pump chamber 13, the tube 12 and the diaphragm 2 does not risk consequently any reduction in volume. Furthermore, if the pressure has a tendency to rise too much inside the space comprised between the stuffing boxes 32 and 33 by reason of the fact that the leaks through the stuffing box 32 are smaller than the amount of liquid pumped into said space, the excess of liquid will raise the flap valve 26 against the action of the diaphragm 25 and is returned as in the preceding case through the pipe 27 into the vat 22.

The intermediate driving liquid used may be constituted by oil or any other suitable liquid. It may also be selected so that it does not risk producing a violent reaction with the liquid to be conveyed in the case of a breaking of the diaphragm and in fact it may be selected so as to produce a colored reaction which serves as a warning in the case of such a breaking. The arrangement may also be designed in a manner such that a breaking acts automatically on a relay system so as to produce automatically a stoppage of the pumping operation.

Figure 6:
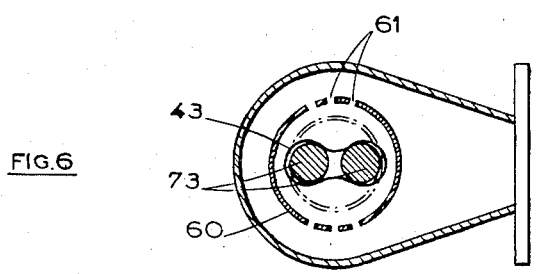
Fig. 6 is a cross-section on a slightly larger scale through line 6—6 of Fig. 5.

In Figs. 5 and 6, 41 designates the admission pipe for the liquid to be conveyed, which may be constituted for instance by a corrosive liquid while 42 designates the delivery pipe. These two pipes are interconnected by a tubular diaphragm 43 the periodical deformation of which produces the desired pumping action. This diaphragm 43 of a generally cylindrical shape is provided in the vicinity of its connection with the pipes 41 and 42 with transverse pleats 44 and 45 which allow said diaphragm to be deformed in its central section without the material forming it being subjected to any substantial elongation in directions perpendicular to its direction of deformation. This diaphragm includes advantageously a body of polyfluorethylene or the like material sheathed inside rubberized canvas so as to prevent in practice any superficial elongation of the diaphragm and to authorise consequently only deformations allowing the superficial area of the diaphragm to remain substantially constant. The two ends 46 and 47 of the diaphragm are clamped by means of a suitable clamping system 48 in a perfectly fluid-tight manner against the ends 49 and 50 of the pipes 41 and 42. 51 designates generally the admission valve and 52 the delivery valve, said valves being of any suitable type although they are preferably flap valves.

The diaphragm 43 is enclosed and held inside a tubular body 53 adapted as disclosed hereinafter to contain the intermediate driving or controlling liquid. Said tubular body communicates through a lateral opening 54 and a pipe 56 with the controlling piston pump 55.

57 designates the opening which serves for filling the tubular body 53 while 58 designates an opening for draining the latter, said openings 57 and 58 serving for the filling and the emptying of the oil of the like intermediate controlling fluid. 59 designates the exhaust port for the air which escapes during the filling operation. There is also provided coaxially inside the tubular body 53 and on the outside of the diaphragm 43 an intermediate cylindrical wall 60 in which are formed perforations 61 which latter are not distributed uniformly throughout the surface of the wall but are formed only in two diametrically opposed areas (Fig. 6); this arrangement has for its object to direct the pressure exerted by the oil-handling pump towards two diametrically opposed areas of the diaphragm in a manner such that said diaphragm is deformed in said areas.

62 designates the piston of the controlling pump 55 which piston is capable of moving over a path the length of which is adjustable during operation while its position of maximum compression as illustrated in the drawing is always the same, whatever may be said adjustment. The position of maximum suction varies on the contrary in accordance with said adjustment. It is possible in particular to resort to this end to the piston-controlling means described in particular in the prior above-referred to patent application.

In the pipe 56 connecting the body of the piston pump with the nozzle or opening 54, there opens a branch pipe 63 enclosing a gauged valve 64 subjected to the pressure of the spring 65, said branch pipe being connected through said valve with a container 66 the part played by which will be disclosed hereinafter. A further tubular body 67 provided with a valve 68 is connected through a pipe 69 with the upper end of the container 66. The lower part of the container 66 opens on the other hand into a pipe 70 through which the oil is allowed to enter a recess 71 formed in the stuffing box or packing 72 for the piston 62.

This arrangement operates as follows: when the piston is located in its position of maximum compression illustrated in Fig. 5, the diaphragm 43 subjected to the pressure of the oil surrounding said diaphragm is deformed and is flattened in its central section, the flattening being performed in a direction perpendicular to the flow of oil passing through the perforations 61.

When the piston moves towards its outer extreme suction position, the diaphragm is deformed in the opposite direction whereby the volume bounded by the diaphragm and its two valves increases by an amount corresponding to the volume generated by the movement of the piston. This produces a suction which causes an amount of liquid to be pumped to enter said diaphragm, said amount being exactly equal to the volume of oil which has been shifted by the piston 62.

When the piston begins its next compression stroke its urges the oil towards the diaphragm and the volume inside said diaphragm between the two valves is reduced by an amount equal to the volume of oil delivered by the piston moving in the pump body 55. The liquid contained inside the diaphragm opens the delivery valve 52 and flows into the delivery pipe 42. Consequently the amount of liquid delivered by the diaphragm is exactly equal to the amount of oil delivered by the piston 62. A modification in the stroke of the piston through any means known per se allows modifying the output of the piston pump and of the diaphragm in accurately corresponding manners.

The arrangement is preferably filled with oil so that when the controlling pump is adjusted so as to provide a maximum suction stroke, the diaphragm assumes a cylindrical shape for which it defines a maximum volume when the piston 62 is in its suction position. This result is obtained automatically as will be described hereinafter by making the piston pump operate with its maximum stroke during only a few cycles.

If the pump is subsequently adjusted for a smaller output per stroke, the diaphragm will obviously not return to its cylindrical shape for the extreme suction position of the piston.

In order that the volume of liquid inside the diaphragm may be as small as possible for the maximum compression position illustrated, which is obviously of advantage, it is of interest to provide inside the diaphragm a mandrel, the cross-section of which corresponds substantially to that of two cylindrical members 73 as illustrated in Fig. 6. The presence of said mandrel does not disturb by any means the operation of the diaphragm and, in contradistinction, the volume occupied by it decreases by a corresponding value the residual volume of liquid carried inside said diaphragm.

In order that the arrangement described may operate in a perfectly reliable manner, it is obviously necessary that the amount of controlling oil may remain sufficiently large for it to fill the whole capacity intended for it. Now, if sufficient oil losses appear, it may occur after a certain time that the diaphragm instead of being flat as illustrated in its maximum compression position, assumes its cylindrical shape defining a maximum volume. A suction stroke of the piston 62 would then produce no modification in the volume defined by said diaphragm and the arrangement would be no longer operative. The operation is in practice modified then as follows: during the next suction stroke, the diaphragm not being expansible cannot obviously be deformed and the suction of the piston will consequently not act on the diaphragm, but this suction of the piston will produce a vacuum inside the capacity 55—56. This vacuum will produce an opening of the valve 64 which is slightly urged onto its seat by the gauged spring 65 and this results in a flow of oil out of the container 66 into the capacity 55, 56 and, at the end of the stroke of the piston 62, the whole capacity comprising the chamber 55 enclosing said piston and the pipe 56 will be almost entirely filled and consequently, during the next delivery stroke, the diaphragm 43 will be compressed again by an amount corresponding to the volume of oil delivered by the piston. The diaphragm pump will therefore begin operating again with the same output as at the start. The result is consequently the loss of one or a few volumes corresponding to single reciprocations of the piston of the control pump and this is practically negligible for a protracted operation of the pump so that the reliability can be considered as substantially complete.

In the case, in contradistinction, where the volume of oil becomes excessive and the oil pressure becomes too large inside the controlling piston pump, the overpressure safety valve 68 opens and returns the excess of oil into the container 66.

In order to reduce to a maximum the losses of oil and the entrances of air, there is provided, in accordance with the invention, and as already described, a by-pass 70 which returns the oil from the container 66 into the recess 71 formed in the stuffing box 72 and said oil forms with the stuffing box a highly efficient packing which prevents any losses of oil and chiefly any entrance of air under the action of a drop in the sealing pressure.

It is also possible to provide various modifications to the embodiment disclosed without unduly widening thereby the scope of the invention as defined in the accompanying claims.

In the case of the embodiment illustrated in Figs. 1 to 5, it has been assumed that the driving liquid was contained inside the pocket-shaped diaphragm while the liquid to be conveyed is carried outside the latter. It is obviously possible to provide the driving liquid on the outside of the diaphragm and the liquid to be conveyed inside the latter.

Lastly, in all cases and although the invention has been described as applicable to pumps, the output of which is adjustable, it may of course be applied as well in the case of pumps the output of which is not adjustable.

What I claim is:

1. A pumping system comprising a cylindrical cross-sectionally deformable tubular diaphragm open at both ends, and made of polyfluorethylene, a tubular screen surrounding the diaphragm and provided with perforations lying in two diametrically opposed areas, a rigid chamber enclosing said screen and said diaphragm and forming with the latter an annular compartment containing an auxiliary driving liquid, a reciprocating piston acting through said auxiliary liquid on the diaphragm to deform the latter intermittently, a circuit for the liquid to be conveyed, extending through the inside of said tubular diaphragm inside which the last-mentioned liquid is subjected to the action of the deformation of the diaphragm and is constrained thereby to progress through its circuit by batches accurately equal in volumes to the volumes displaced by the piston for each forward stroke of the latter and non-return valves controlling the passage of the liquid through the said circuit respectively ahead of and beyond the diaphragm.

2. A pumping system comprising a cylindrical cross-sectionally deformable tubular diaphragm open at both ends and made of a material of a low elasticity, a rigid chamber enclosing said diaphragm and forming with the latter an annular compartment containing an auxiliary driving liquid, a reciprocating piston pump acting through said auxiliary liquid on the diaphragm to deform the latter intermittently, a circuit for the liquid to be conveyed, extending through the inside of said tubular diaphragm inside which the last mentioned liquid is subjected to the action of the deformation of the diaphragm and is constrained thereby to progress through its circuit by batches accurately equal in volumes to the volumes displaced by the piston for each forward stroke of the latter, non-return valves controlling the passage of the liquid through the said circuit respectively ahead of and beyond the diaphragm, means for automatically compensating the leaks of auxiliary liquid, including a container, a connection inserted between the latter and the circuit of auxilitry liquid and a safety valve in said circuit adapted to open whenever the pressure sinks inside said circuit, a further valved connection inserted between the container and the said circuit and adapted to cut out any overpressure due to an excess of auxiliary liquid inside said circuit, an annular packing sealing the piston pump and provided with an annular recess in its central section and means for admitting a fraction of the auxiliary liquid from said container into said recess to limit the leaks of liquid out of said pump and the entrance of air into same.

3. A pumping system comprising a cylindrical cross-sectionally deformable inelastic tubular diaphragm open at both ends and provided near each end with transverse pleats to provide a variable volume under the action of varying pressure, while retaining a substantially unvarying outer area, a rigid chamber enclosing said diaphragm and forming with the latter an annular compartment containing an auxiliary driving liquid, a piston pump having passage means connected to the chamber acting through said auxiliary liquid on the diaphragm to move the latter intermittently, a circuit including valve means for the liquid to be conveyed, extending through the inside of said tubular diaphragm inside which the last-mentioned liquid is subjected to the action of the movement of the diaphragm and is constrained thereby to progress through its circuit by batches equal in volume to the volume displaced by the piston for each forward stroke of the latter.

References Cited in the file of this patent
UNITED STATES PATENTS

| | | |
|---|---|---|
| 2,046,491 | Scott | July 7, 1936 |
| 2,478,568 | Coe | Aug. 9, 1949 |
| 2,738,731 | Browne | Mar. 20, 1956 |
| 2,753,805 | Boivnet | July 10, 1956 |